Patented Oct. 3, 1922.

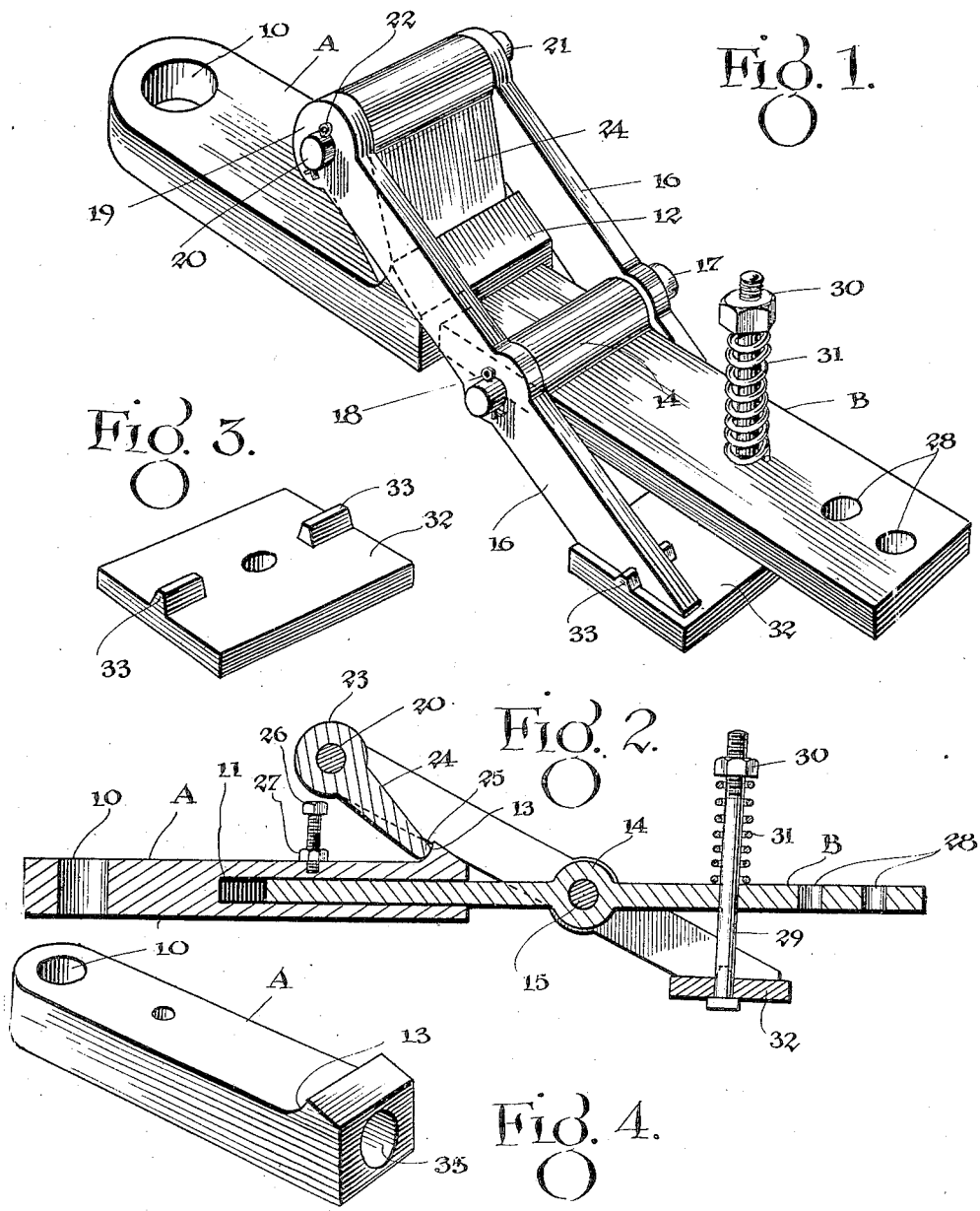

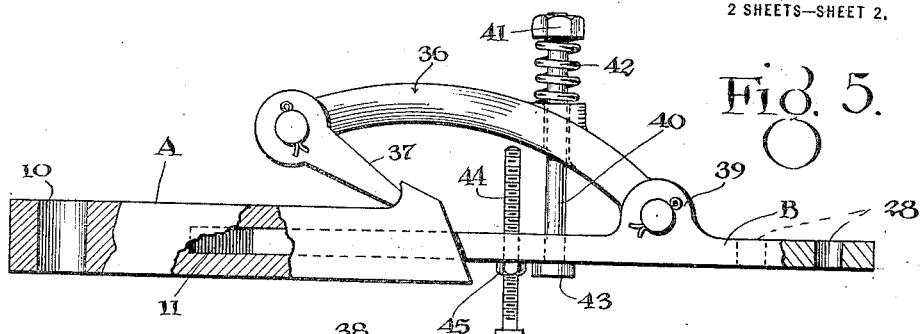
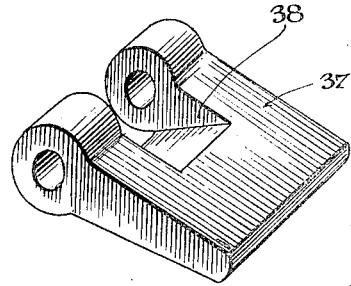
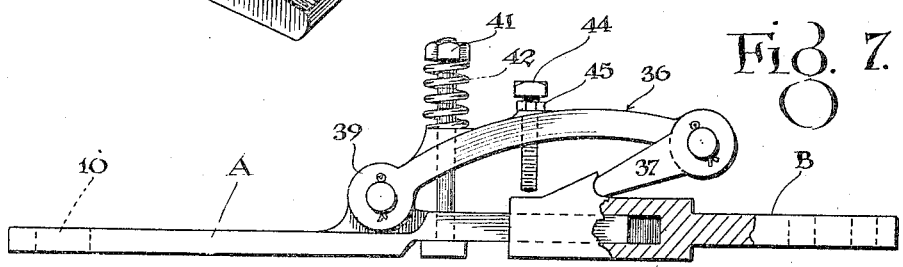
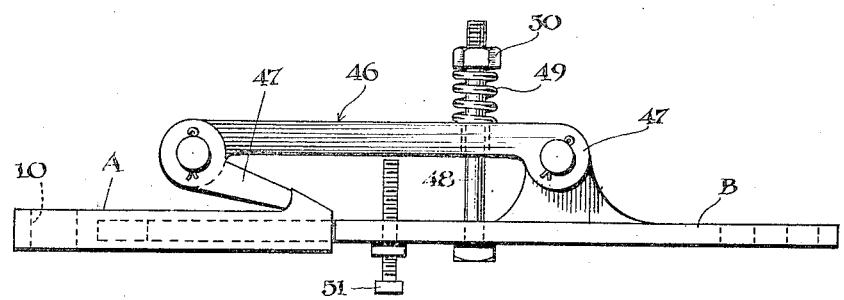

1,430,922

UNITED STATES PATENT OFFICE.

WILLIAM ANTON MUELLER, OF ABERDEEN, SOUTH DAKOTA.

DRAWBAR COUPLING FOR TRACTORS.

Application filed November 15, 1921. Serial No. 515,271.

*To all whom it may concern:*

Be it known that I, WILLIAM A. MUELLER, a citizen of the United States, and a resident of Aberdeen, in the county of Brown and State of South Dakota, have invented certain new and useful Improvements in Drawbar Couplings for Tractors, of which the following is a specification.

This invention relates to a draw bar coupling for tractors or the like.

The object of the invention is to provide a draw bar coupling for tractors by which a plow or other draft appliance may be coupled to the tractor in an easy and expeditious manner, and said coupling adapted to automatically release the tractor from the draft appliance upon a predetermined resistance being offered by the draft appliance to being drawn by the tractor.

It is also an object of the invention that the coupling be reliable in operation.

It is a further object of the invention that the device be extremely simple in construction and adapted to serve as a coupling between the draft bar of any type of tractors and any draft appliance.

Other objects, and objects relating to details of construction, combination and arrangement of parts will hereinafter appear in the detailed description to follow.

The invention is illustrated by way of example in the accompanying drawings, in which:—

Figure 1 is a perspective view of a coupling embodying the present invention,

Figure 2 is a longitudinal vertical sectional view of the same,

Figure 3 is a perspective view of the spring plate associated therewith,

Figure 4 is a perspective view of a modified form of one of the telescoping bars of the coupling, Figure 5 is a side elevation of a modified form of coupling, parts being broken away and shown in section to illustrate the invention, Figure 6 is a detailed perspective view of the release plate associated with the form of coupling shown in Figure 5, Figures 7 and 8 are side elevations showing further modified forms of the coupling.

Similar reference characters refer to similar parts throughout the drawings.

Referring to the drawings in detail and particularly to Figures 1 to 3 inclusive A and B indicates generally the two members of the coupling which extend between the tractor and draft appliance with which the coupling may be associated. These members are referred to by the letters A and B throughout the drawings including the modified forms of the coupling shown. The member A which is adapted to be connected to the draw bar of a tractor is preferably in the shape of a short bar as shown, having its forward end formed with a bolt receiving opening 10 and its rear end portion being hollow to form a passage 11 which is preferably rectangular in cross section and adapted to receive the bar B, or in other words, telescope the same. Also the member A is formed at its rear end and upon the upper face thereof with a lug 12, said lug having a forward face arcuate in shape as indicated at 13, Figure 2, the purpose of which will later appear.

The bar B is formed at a point intermediate its ends with a bearing sleeve 14 through which there extends a pin 15, said pin being of greater length than the bearing sleeve 14, and journaled upon each of its ends is a rocker arm 16, said rocker arms being held upon the pin by the head 17 and cotter pin 18. Each rocker arm is preferably of the shape shown and having its forward end formed with a circular enlargement 19, said circular enlargements being each provided with an opening through which there is extended a pin 20, said pin being held in position by its head 21 and cotter pin 22 and journaling a sleeve 23 which is formed with a radial plate 24 heretofore termed the release plate. The free end of the plate 24 is beveled as indicated at 25 so that the same is complemental to the arcuate face 13 of the lug 12.

Immediately beneath the sleeve 22 there is threaded into the member A a set screw 26, the upper end of which is adapted to be brought into abutting relation with the sleeve 23 and so held by the means of a lock nut 27.

The rear end of the member B of the coupling is provided with a pair of openings 28 by which the same may be adjustably connected with a draft appliance, and forward to these openings there is provided a similar opening through which there is extended a bolt 29, said bolt carrying the nut 30 upon its upper end, and interposed between said nut and the member B is a coiled spring 31, upon the lower end of the bolt there is supported a plate 32 which is heretofore referred to as a spring plate, said plate being of sufficient width to extend between the rocker arms 16 and having an upstanding pointed lug 33 formed at each end thereof. The rear end of each rocker arm is inclined, as shown, and provided with a suitable recess adapted for receiving the associated lug 33.

In the operation of this device the coupling may be extended between the draw bar of the tractor and a plow or the like, the member A being pivotally connected to the draw bar and the member B rigidly connected to the beam of the plow. The operative parts should then be in the position, as shown in Figure 1. Now upon the forward movement of the tractor the release plate 24 will rotate to separate the members A and B when sufficient resistance is offered by the plow connected to member B. The purpose of the spring 31 is to hold the release plate 24 in its adjusted position, that is, in the position at which the necessary resistance of the member B for operating the release plate 24 is known. If it is desired to increase the amount of pulling strain upon the member B before the same will operate the release plate 24 then the set screw 26 should be lowered and thus bringing the plane at which the release plate 24 is disposed nearer to the horizontal and nearer to alignment with the plate B. If it is desired to decrease the pulling strain required upon member B to operate the release plate 24 then the adjusting screw 26 should be raised. The release plate 24 may be very closely adjusted in this manner.

Referring to Figure 4 the member A shown represents the front member of a coupling in which the passage 11 for telescoping the rear member B is circular as shown at 35.

Referring to Figure 5 the construction of the members A and B are the same as in Figure 1, but in this instance only one rocker arm is used, said rocker arm being indicated by the reference numeral 36. Upon the forward end of the rocker arm there is journaled the release plate 37 shown in Figure 6. The specific construction of the release plate is slightly different than that shown in Figure 1; the difference being represented by a recess 38. The rocker arm 36 in this instance is slightly curved, as shown, and having its rear end pivoted to the bearing sleeve 39 formed upon the plate B. The rocker arm 36 is formed adjacent its rear end with an opening through which there extends a bolt 40, said bolt carrying the nut 41 at its upper end and having interposed between the nut and rocker arm a compression spring 42. The lower end of the bolt extends through the plate B, as shown, and held against upward movement by its head 43. Forward to the bolt 40 there is threaded through the plate B a set screw 44 and the lower end of which is adapted to be brought to abut against the lower side of the rocker arm 36. Also this set screw carries a lock nut 45 by which the same may be held in adjusted position.

The operation of the device shown in Figure 5 is thought to be entirely clear from that recited for the coupling shown in Figure 1 and no further explanation need here be given.

Referring to Figure 7 in this instance the operative parts are duplicate to that shown in Figure 5, and the same reference numerals will be used in referring thereto. The only change that is made is that the rocker arm 36 is pivoted to the forward member A instead of being pivoted to the rear member B. Also the adjusting screw 44 is carried by the rocker arm 36 instead of by the plate B which of course is of minor importance.

Referring to Figure 8 the rocker arm 46 in this instance is straight instead of being curved. It is pivoted as at 47 to the member B and has journaled at its forward end the release plate 47. A bolt 48 is extended through the plate B and then upward through the rocker arm 46 and carries a compression spring between its nut 50 and the rocker arm. Also an adjustable set screw 51 is carried by the plate B and adapted to have its upper end to be brought to abut against the rocker arm 46 for raising the same.

The operation of the couplings shown in Figures 7 and 8 is thought to be entirely clearly from that given for the coupling shown in Figure 1.

While I have shown and described the preferred form of my invention, I wish it to be understood that I am aware of the fact that the construction, combination and arrangement of parts may be changed by those skilled in the art without departing from the spirit of the invention.

I claim:—

1. A coupling of the character described, comprising a pair of coupling members, an arm turnably supported by one of said coupling members and the rotative axis of said arm being disposed transverse to the longitudinal axis of the associated coupling member, a latch member turnably supported by the one end of said arm and adapted to engage at its free end with a projection extending from the other coupling member whereby to hold the coupling members together, and means associated with the other end of said arm adapted to yieldingly resist rotative movement thereof in one direction.

2. A coupling of the character described, comprising a pair of coupling members, an arm turnably supported by one of said coupling members and the rotative axis of said arm being disposed transverse to the longitudinal axis of the associated coupling member, a latch member turnably supported by the one end of said arm and adapted to engage at its free end with a projection extending from the other coupling member whereby to hold the coupling members together, means associated with the other end of said arm adapted to yieldingly resist rotative movement thereof in one direction, and means whereby the arm will be limited against rotation in the opposite direction.

3. A coupling of the character described, comprising a pair of coupling members, an arm turnably supported by one of said coupling members and the rotative axis of said arm being disposed transverse to the longitudinal axis of the associated coupling member, a latch member turnably supported by the one end of said arm and adapted to engage at its free end with a projection extending from the other coupling member whereby to hold the coupling members together, means associated with the other end of said arm adapted to yieldingly resist rotative movement thereof in one direction, and adjustable means whereby said arm may be limited against rotation in the opposite direction.

4. A coupling of the character described, comprising a pair of coupling members, an arm turnably supported by one of said coupling members and the rotative axis of said arm being disposed transverse to the longitudinal axis of the associated coupling member, a latch member turnably supported by the one end of said arm and adapted to engage at its free end with a projection extending from the other coupling member whereby to hold the coupling members together, and adjustable means for yieldingly resisting the rotation of said arm in one direction.

5. A coupling of the character described, comprising a pair of coupling members disposed in end alignment with each other, a pair of arms rotatably supported by one coupling member, the rotative axis of said arms being disposed transverse to the longitudinal axis of the associated coupling member, a latch member rotatably supported between the forward ends of said arms, a projection upon the other coupling member with which the free end of said latch member is adapted to engage, said projection being at the rear of the rotative axis of the latch member, and yieldable means associated with the rear ends of the arms adapted to yieldingly resist the rotation thereof in one direction.

6. A coupling of the character described, comprising a pair of coupling members disposed in end alignment with each other, a pair of arms rotatably supported by one coupling member, the rotative axis of said arms being disposed transverse to the longitudinal axis of the associated coupling member, a latch member rotatably supported between the forward ends of said arms, a projection upon the other coupling member with which the free end of said latch member is adapted to engage, said projection being at the rear of the rotative axis of the latch member, yieldable means associated with the rear ends of the arms adapted to yieldingly resist the rotation thereof in one direction, and adjustable means adapted to limit the rotation of said arms in the opposite direction.

WILLIAM ANTON MUELLER.